United States Patent
Smith-Mickelson et al.

(10) Patent No.: US 12,395,903 B1
(45) Date of Patent: Aug. 19, 2025

(54) APPARATUSES AND METHODS INVOLVING CALL ROUTING VIA DISPARATE TYPES OF COMMUNICATION PATHS

(71) Applicant: 8x8, Inc., Campbell, CA (US)

(72) Inventors: Jared Smith-Mickelson, Campbell, CA (US); Garth Judge, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 576 days.

(21) Appl. No.: 17/736,934

(22) Filed: May 4, 2022

(51) Int. Cl.
*H04W 40/36* (2009.01)
*H04W 36/00* (2009.01)

(52) U.S. Cl.
CPC ........... *H04W 36/0069* (2018.08); *H04W 36/008375* (2023.05); *H04W 40/36* (2013.01)

(58) Field of Classification Search
CPC ..... H04W 36/0069; H04W 36/008375; H04W 40/36
See application file for complete search history.

(56) References Cited

U.S. PATENT DOCUMENTS

| | | | |
|---|---|---|---|
| 5,473,732 | A | 12/1995 | Chang |
| 6,424,935 | B1 | 7/2002 | Taylor |
| 7,236,932 | B1 | 6/2007 | Grajski |
| 8,493,937 | B2 | 7/2013 | Nix |
| 8,611,209 | B2 | 12/2013 | Berg et al. |
| 8,788,535 | B2 | 7/2014 | Bonev et al. |
| 9,432,519 | B1 | 8/2016 | Liu et al. |
| 9,494,000 | B2 | 11/2016 | Grigsby et al. |
| 10,142,329 | B1 | 11/2018 | Liu |
| 10,318,617 | B2 | 6/2019 | Gelfand et al. |
| 10,582,435 | B2 | 3/2020 | Srivastava et al. |
| 10,594,502 | B1 | 3/2020 | Soroker et al. |
| 10,659,243 | B1 | 5/2020 | Soroker et al. |
| 10,735,592 | B1 | 8/2020 | Liu et al. |
| 10,939,179 | B2 | 3/2021 | Park et al. |
| 11,025,488 | B1 | 6/2021 | Arsanjani et al. |
| 11,044,338 | B1 | 6/2021 | Arsanjani et al. |
| 11,070,640 | B1 | 7/2021 | Arsanjani et al. |

(Continued)

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — Rafael Perez-Gutierrez
*Assistant Examiner* — Gilbert M. Grant
(74) *Attorney, Agent, or Firm* — Vista IP Law Group, LLP

(57) ABSTRACT

In certain examples, a service provider provides communications services with endpoint devices. The data-communications services are established via redundant media channels from among disparate last-segment channel types (Wi-Fi, cellular network, etc.) accessible to one endpoint device through an edge server. An incoming call involving one endpoint device is routed via the service provider via primary and secondary network connections via respective first and second ones of the disparate last-segment channel types. In response to the location data for the endpoint device or QoS data, media of the incoming call is combined to improve the quality of the provided data communications services.

19 Claims, 4 Drawing Sheets

(56) References Cited

U.S. PATENT DOCUMENTS

| | | | |
|---|---|---|---|
| 11,252,214 B1* | 2/2022 | Pawar | H04L 65/80 |
| 2003/0055974 A1 | 3/2003 | Brophy et al. | |
| 2004/0143559 A1 | 7/2004 | Ayala | |
| 2008/0086564 A1 | 4/2008 | Putman et al. | |
| 2009/0112875 A1 | 4/2009 | Maes | |
| 2009/0276215 A1 | 11/2009 | Hager | |
| 2011/0046960 A1 | 2/2011 | Spier et al. | |
| 2012/0120962 A1* | 5/2012 | Li | H04W 12/069 370/401 |
| 2013/0244654 A1 | 9/2013 | Carmon et al. | |
| 2014/0100848 A1 | 4/2014 | Shaffer et al. | |
| 2015/0079999 A1* | 3/2015 | Toker | H04L 47/805 455/445 |
| 2015/0133126 A1* | 5/2015 | Liu | H04W 76/16 455/437 |
| 2016/0095056 A1 | 3/2016 | Lebon-Schneider et al. | |
| 2016/0227035 A1 | 8/2016 | Kumar et al. | |
| 2017/0006161 A9 | 1/2017 | Riahi et al. | |
| 2017/0150416 A1* | 5/2017 | Malhotra | H04W 36/0016 |
| 2018/0315000 A1 | 11/2018 | Kulkarni et al. | |
| 2019/0230675 A1* | 7/2019 | Papa | H04W 40/04 |
| 2020/0367152 A1* | 11/2020 | Boberg | H04W 48/17 |
| 2022/0386164 A1* | 12/2022 | Lee | H04W 28/0273 |
| 2023/0076600 A1* | 3/2023 | Marupaduga | H04W 36/0058 |
| 2023/0397084 A1* | 12/2023 | Shah | H04W 40/12 |

OTHER PUBLICATIONS

Alex Heath. Merge Clears Up Confusion by Combining iMessages From Multiple Device IDs Right In iOS [JailbreakCon]. https//www.cultofmac.com/category/news/, 9 sheets (Sep. 29, 2012).

* cited by examiner

APPARATUSES AND METHODS INVOLVING CALL ROUTING VIA DISPARATE TYPES OF COMMUNICATION PATHS

OVERVIEW

Aspects of various embodiments are directed to data communications including methods and systems for routing wireless data communications such as voice and other media intelligently in environments where user equipment has access to multiple different communication pods or types of channels for connecting with an edge media server.

Users often experience call degradation when there are handoffs of communications between different types of networks including, but not limited to, cellular and Wi-Fi networks. If even 100 milliseconds of audio is lost in connection with a handoff, the user at the receiving end of the call may notice a gap in the audio.

Moreover, there is an increasing number of different types of networks available to many users and while each of these networks should be more freely accessible to users, there are an increasing number of issues that mitigate fair use of these different networks. For example, while each of these networks may provide one or more channels as being accessible to the user equipment, such channels may manifest varying levels of noise which is not readily apparent to the user of the equipment. Another issue is the potential loss of security on certain channels made available by such networks and, for transfer of sensitive, careful selection of the most secure channels is difficult to achieve. Yet another issue concerns requirements of many systems for a user to specify and approve moving a current data communication from one such network to another even though in many instances the user would have insufficient knowledge of whether such a move is advisable. Consequently, the likelihood of a user choosing the wrong network for the wrong reasons is high.

Accordingly, certain aspects of the present disclosure are directed to overcoming the above and other issues by intelligently managing call connectivity involving user equipment in such last-segment channels in light of signal-quality degradation and/or other issues including, but not necessarily limited to, those mentioned above.

SUMMARY

Various example embodiments are directed to one or more issues such as those addressed above and/or others which may become apparent from the following disclosure concerning intelligent multi-path routing to better manage handoff of media between different types of networks (e.g., Wi-Fi, cellular, DSL, Satellite Internet, Bluetooth, Infrared, etc.) which are available to endpoint devices and which may be subject to communications issues or problems in the last segment of media delivery. These issues or problems include, for example, delivery of audio calls (and other types of media such as data and video) between user-communication endpoint devices ("endpoint devices"). These types of devices typically include a user interface and communications circuitry which enables the devices to communicate over broadband networks (e.g., the Internet), and they include without limitation smartphones, tablets, desktop CPUs, etc.

In certain example embodiments, aspects of the present disclosure are directed to apparatuses (e.g., systems, devices and/or circuits) involving a service provider which is to provide communications services for such endpoint devices. The data-communications services are established via redundant media communication channels selected from among disparate last-segment channel types of a network that is accessible to one endpoint device through an edge server (aka edge media server). Further and in connection with more particular examples which may build on the above-described aspects, a media management decision may be generated and used to manage a state of media data for an electronic communication (e.g., anticipated or ongoing) including multi-path routing of media data across media communication channels. For example, an incoming call involving one endpoint device is routed via primary and secondary network connections (corresponding to respective first and second ones of the disparate last-segment channel types) and a media management decision is made by the server (e.g., via one or more computing processors arranged to provide the server) on whether to combine media data from the primary and secondary network connections or otherwise modify a state of media data transmission relative to network connections (established or in a proactive manner). As such, media management decisions thereby aid multi-path routing of media data during electronic communications including improving communication quality and redundancy to avoid potential connectivity issues, among other technical advantages. A media management decision of the present disclosure is generated based on one or more of various factors as may be configured by the service provider for the benefit of the endpoint device, including but not limited to: actual and/or anticipated location transition (e.g., of an endpoint device such as a client computing device); quality of service (QOS) evaluations relating to a quality of network connection(s) that are used for a communication (ongoing or anticipated); and/or other contextual data including review of user profile preferences for management of media data (e.g., user profile of an application/service, historical usage data (e.g., log of historical network connections), and/or user feedback such as that which may be received via graphical user interface (GUI) interactions with a user of an application/service (e.g., a SaaS application/service such as a cloud-based communication application/service).

In the present disclosure, the import of certain terms may be appreciated from the above contexts. For instances, any reference to a threshold determination or the like refers to a threshold evaluation set (e.g., by developers) using one or more of the above referenced factors. Also, any reference to location transition of the endpoint device refers to a change in geographic position of the endpoint device wherein the change is sufficiently significant to consider, or be associated with, a possible change in network connection from one (e.g., primary) type of network connection to another (e.g., secondary) type of network connection. As examples, an anticipated location transition may be a predicted change in geographic position, relative to one or more network connections, and this change may be predicted by an analytics module of the system, whereas an actual location transition as may be detected by a location-tracking module of the system which monitors or received notifications of geographic positions, relative to one or more network connections, of the endpoint device. In certain instances, the present disclosure may refer to anticipated/actual location transition and this term is used in examples and contexts involving the system making a media management decision based on any of three different cases: (i) a prediction of an anticipated location transition as discussed above; (ii) a detection of an actual location transition as discussed above; and (iii) a prediction of an anticipated location transition and a detection of an actual location transition (both as discussed above). Further, unless otherwise indicated, the term incoming call refers to a call that is seen as coming in to the provider server (e.g., incoming from an endpoint device initiating the call for routing the call to another endpoint device).

In a more-specific example embodiment, deciding whether to use selected portions of the connections from the primary and secondary network connections for multi-path routing of communication media data is based on at least one quality of service (QOS) parameter involving assessment of the current connection along with an anticipated location transition of the endpoint device. In response to the anticipated location transition and a result of a threshold determination relative to a QoS parameter (e.g., the QoS parameter being above a certain threshold), certain selected media portions of the incoming call are taken from the primary network and from the secondary network and are then combined to improve the quality of the call. This may be realized by reconstructing the media, in a single media stream, by drawing packets from two different the primary and secondary network connections while they are operating concurrently to convey media between the user's endpoint device and the edge server, and such combining may occur (e.g., in response to a software application being downloaded from the provider server) at the edge server and/or at the user's endpoint device. Certain media portions in the primary network connection may indicate latency issues and certain other media portions in the secondary network connection may indicate packet loss issues. By combining selected media packets to avoid these media portions, the participants of the call experience improved QoS (e.g., without such latency, noise and/or packet loss issues).

As more specific examples regarding such above-noted aspects, one of the available disparate last-segment channel types may be better suited for the type of event such as may be influenced by: the sensitive context of the call, the types of user equipment to be employed for the call, the number of individuals on the call, the need for a highly-secure channel for the call, whether the call is business related or personal, whether there may be a need for other functions provided in connection with the call and available only via one channel type, and a history of poor reception in calls regarding individuals involved in the call.

In other such specific examples relating to or building on the above aspects, such a data-communications system may include analytics circuitry. In one such example, more than two disparate networks are available as a redundant channel to the endpoint device and the edge server, and the analytics circuitry is to predict and suggest an optimal one of the disparate last-segment channel types based on the anticipated location transition, preferred channel types in a user profile, an event scheduled on a personal calendar associated with the user profile, user feedback provided through interactions with users including receipt of user input provided relative to GUI notifications generated and rendered for users, and/or an event associated with the anticipated congestion of one or more of the disparate last-segment channel types.

As referenced above, examples of the present disclosure further extend to management of GUI notifications relative to media management decisions, where a GUI of an application/service (e.g., SaaS application/service such as a cloud-based communication application/service) is adapted to enable rendering and management of exemplary GUI notifications. This includes the ability to generate, render and enable interaction with GUI notifications pertaining to a media management decision including but not limited to: 1) a decision as to whether to combine media data from the primary and secondary network connections; and 2) a decision to modify a state of media data transmission relative to network connections (established or otherwise proactively) to enhance multi-path communication routing by improving communication quality and redundancy of a communication (ongoing or anticipated). In some examples, GUI notifications of the present disclosure may include data insights relative to media management decisions which insights may be made available for review and/or edit by the user via the GUI. For instance, a GUI notification may provide data insights derived from media management decisions, where a GUI notification may be generated and rendered to inform a user with regard for how media is being managed relative to a communication (e.g., application of one or more network connections, state of applied network connections, etc.). In another instances, GUI notifications may provide users with data insights pertaining to contextual data that aids in generation of media management decisions including but not limited to: user profile settings, historical usage data and/or user feedback previously received relative to media management decisions. In further examples, GUI notifications may include actionable GUI elements that enable users, via an endpoint device, to provide user feedback for media management decisions. For instance, a GUI notification may comprise a selectable GUI element that enables users to, among other examples: accept/reject a media management decision, undo an automatically applied media management decision; and provide user feedback pertaining to media management decisions or settings for a user profile of an application/service. In at least one example, exemplary media management decisions occur based on threshold determination(s). For instance, if a first pre-selected threshold is satisfied, a state of network connection(s) may be automatically updated. If a second pre-selected threshold is satisfied, a GUI notification may be automatically generated and rendered for a user to provide feedback as to whether to update the state of network connection(s). In examples where GUI notifications are generated and rendered, it is to be recognized that processing for generation and rendering of GUI notifications may occur via one or more server-side computing devices, one or more client-side computing devices or a combination thereof. In one example, a GUI notification may be generated and transmitted by a network server and subsequently received at an endpoint device for rendering. In another example, computing instructions may be transmitted (e.g., from a server-side computing device) to an endpoint device for generation and rendering of a GUI notification.

Further examples of the present disclosure pertain to real-time (or near real-time) management of a state of network connections relative to a communication (e.g., call communication, electronic meeting, etc.). For example, an initial media management decision may be executed to combine media data from the primary and secondary network connections to support a communication (e.g., ongoing or anticipated), where that initial decision is then automatically applied to maintain a quality of a communication via a SaaS application/service (e.g., a cloud-based communication application/service). Subsequent contextual analysis of a quality of the communication is further programmed to occur (e.g., at predetermined time intervals thereafter), where applied network connection(s) (e.g., the primary and secondary network connections) may be evaluated to continuously manage a quality of a communication as well as improve processing efficiency and/or adhere to user preferences with respect to application of network connections such purposes. Consider an example where a primary network connection is Wi-Fi, and a secondary network connection is a cellular network. Application of a user's cellular network may result in usage of data and/or minutes (e.g., associated with a calling plan), and/or additional pricing considerations. As such, it is optimal to continuously monitor whether a user's cellular network should be applied to support an ongoing communication and/or if that network connection should be replaced with another viable option to support redundancy if required by an application/service (e.g., a cloud-based communication application/service). It follows that the present disclosure is intended to cover technical instances where continued evaluation of a network state of a communication can result in real-time (or near real-time) update of applied network connections. For instance, application usage of a network connection (e.g., a cellular network) can be added/removed or paused/resumed based on evaluation factors such as: actual/anticipated location transition; QoS evaluations relating to a quality of a network connection (prior to, during or after initiation of a communication); and/or other contextual data (e.g., review of user profile preferences, historical usage data (e.g., log of historical network connections), and/or user feedback). In some examples, results of said evaluation can be automatically applied and in other instances GUI notifications (with GUI elements enabling action to be taken) may be generated and rendered via endpoint devices to provide user control over network connection application.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 2A, 2B, 2C, 2D and 2E are respective flow diagrams illustrating example methods of registering and deregistering endpoint devices for managing last-segment channel connections as may be used with a system of the type depicted in or consistent with system aspects of FIG. 1, in accordance with the present disclosure, and wherein FIG. 2A shows an example of media path registration, FIG. 2B shows an example of media path deregistration, FIG. 2C shows an example of media path activation by an endpoint, FIG. 2D shows an example of media path activation by an edge media server, and FIG. 2E shows an example of media path deactivation.

Figure 1:
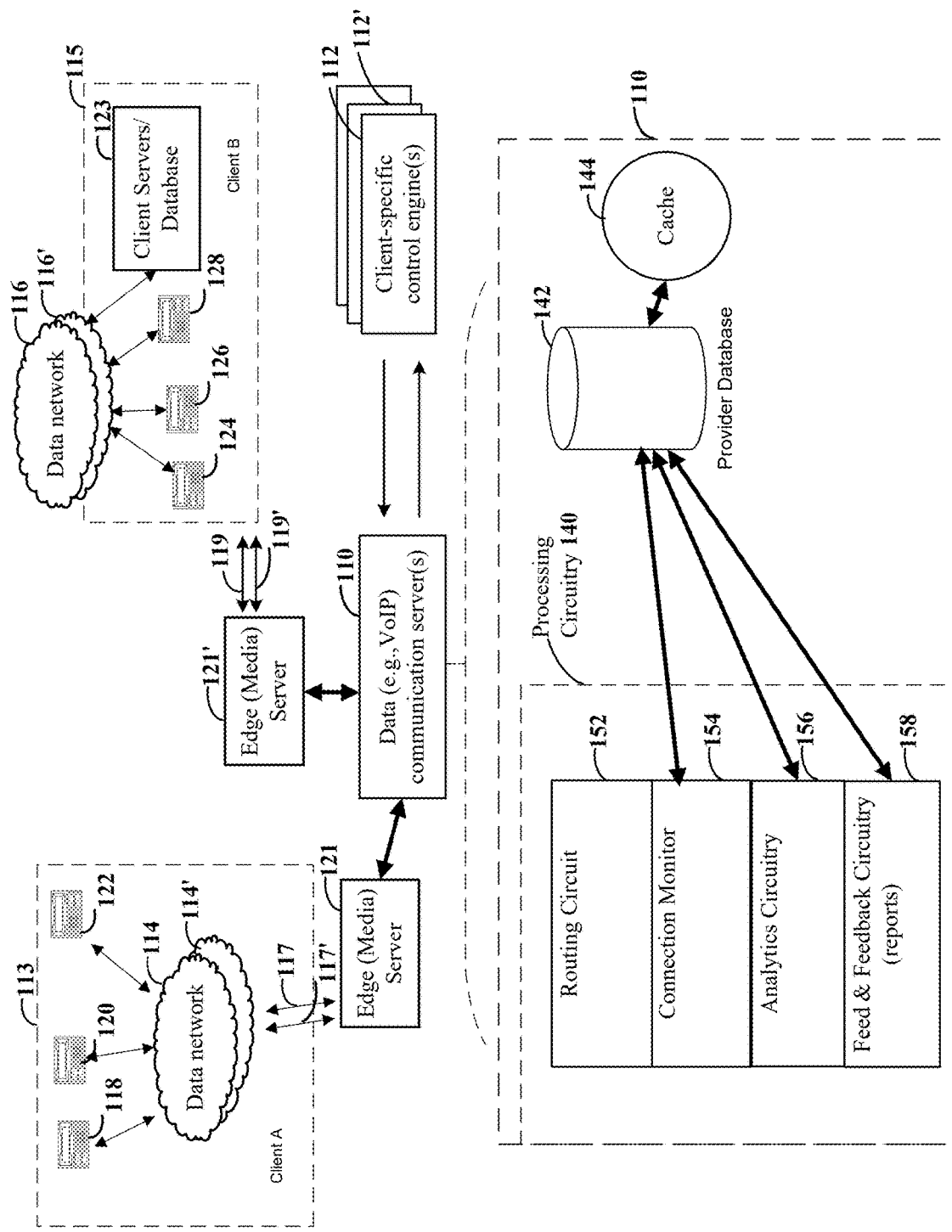
FIG. 1 is a block diagram illustrating an example apparatus in the form of a system, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Various exemplary aspects of the present disclosure are believed to be applicable to a variety of different types of apparatuses, systems and methods involving or concerning multi-path routing to better manage hand-off of audio, video, text and other types of media between different types of networks (e.g., Wi-Fi, cellular, DSL, Satellite Internet, Bluetooth, Infrared, etc.) which are available to endpoint devices. Connections via such networks are subject to varying degrees of communications issues and are associated with different advantages and/or disadvantages in the delivery of routed media. While certain aspects of the present disclosure are directed to intelligent management of such connections in wireless-network contexts such as the exemplary types listed above, the present disclosure is not necessarily limited thereto. Various aspects of the present disclosure may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Exemplary aspects of the present disclosure are directed to apparatuses involving a service provider having a data-communications server for routing data-communications intelligently based on the preferences and/or needs of endpoint devices or of the user. The skilled artisan would appreciate that such endpoint devices receiving routed data communications from such a service provider are commonly based on subscriptions for receiving communications services (e.g., VOIP, virtual office, emailing, messaging, teleconferencing, file access, etc.) for use by the endpoint devices which as noted above include smartphones and other types of user equipment with circuitry enabling communications over the Internet and designated networks. In such contexts, the data-communications services may include intelligent routing on behalf of the endpoint devices by way of certain channels selected from among disparate last-segment channel types (respectively associated with different or disparate types of networks) accessible to one endpoint device through an edge server.

In the present disclosure, media management decisions are generated which are used to manage a state of media data for an electronic communication (e.g., anticipated or ongoing) including multi-path routing of media data across media communication channels. Exemplary media management decisions may comprise but are not limited to: 1) a decision as to whether to combine media data from the primary and secondary network connections; and 2) a decision to modify a state of media data transmission relative to network connections (established or otherwise proactively). As such, media management decisions thereby aid multi-path routing of media data during electronic communications including improving communication quality and redundancy to avoid potential connectivity issues, among other technical advantages. According to the present disclosure, a media management decision may be generated based on one or more of various factors as may be configured by the service provider for the benefit of the endpoint device, including but not limited to: actual/anticipated location transition (e.g., of an endpoint device such as a client computing device); QoS evaluations relating to a quality of network connection(s) that are used for a communication (ongoing or anticipated); and/or other contextual data including review of user profile preferences for management of media data (e.g., user profile of an application/service, historical usage data (e.g., log of historical network connections), and/or user feedback such as that which may be received via graphical user interface (GUI) interactions with a user of an application/service (e.g., a SaaS application/service such as a cloud-based communication application/service). Any reference in the present disclosure to a threshold determination or the like refers to a threshold evaluation set by developers using one or more of the above referenced factors.

For example, an incoming call involving one endpoint device may be routed via the service provider via primary and secondary network connections via respective first and second ones of the disparate last-segment channel types. Certain aspects of the system (e.g., analytics processing circuitry) may assess at least one QoS parameter involving the primary and secondary network connections and/or involving an anticipated location transition of the endpoint device. For example, in response to the anticipated location transition and the QoS parameter being above a certain threshold, the system may begin assessing media packets from both of the networks for combining selected packets to optimize the quality of the call. Once the endpoint device transitions to another location (e.g., corresponding to a venue in which QoS is not typically an issue), the system may cease assessing and/or combining until detection of another event, such as change in location, is detected.

Various more-specific example embodiments may build upon the above types of apparatuses and methods, for example, using similar or different data-communications contexts. In one such example where more than two disparate networks are available to the endpoint device and the edge server, analytics circuitry may be used to predict and suggest an optimal one of the disparate last-segment channel types based on the anticipated location transition, preferred channel types in a user profile, an event scheduled on a personal calendar associated with the user profile, and an event associated with the anticipated congestion of one or more of the disparate last-segment channel types.

In another such specific example, the connection control circuitry is to assess an endpoint-user specific profile as to where the endpoint devices established the primary network connection and to effect establishment of the secondary network connection (and in some instances, the primary and secondary network connections) based on these locations (e.g., as may be indicated by geographic or other location-based reference points). Such locations may be recorded as historical primary and/or secondary network connections in the user profiles and this historical data may be used to predict how to best serve the user's endpoint device such as by readying or setting up a redundant last-segment-path connection for the endpoint device when the system predicts (or detects) that the location of the user's endpoint device is about to change (or has changed) and that use of another network connection is (or is expected to be) available.

In further specific examples: a redundant last-segment-path connection is readied by registering the endpoint device for use of another network, also associated with a disparate channel type, to be used in place of one of the primary and secondary networks. This may occur in response to an indication that the endpoint device has access to acceptable signal quality for use of this other one of the disparate last-segment channel types, wherein such connectivity opportunities for the endpoint device is being based on at least one of a preferred communication channel detected for a current location of the endpoint device, the endpoint device being in a current communication condition; and a threshold transgression concerning a QoS parameter in the last-segment-path connection of one of the in-use networks.

Also, a scoring metric associated with a currently available channel may be used by the system to score the value of a currently-available channel for possible or ongoing use by the endpoint device as a redundant connection channel for the call, and this scoring may be provided by analytics-specific or processing circuitry in the system. The scoring metric may provide indication of value concerning any of a plurality of different issues identifiable from the apparatus and/or a user profile stored for the endpoint device and may be used as part of a decision to draw and combine data from another channel. The scoring metric may be implemented based on preprogrammed and/or anticipated values concerning one or more of issues such as: signal quality, security risks, congestion involving the channel's bandwidth, likelihood of having to change to yet another channel, the number or rate of recently-dropped packets, and/or contexts regarding the current call which may weigh for or against use of any one particular available channel. These issues may be identifiable, for example, from a user profile stored for the endpoint device or for a user of the endpoint device and/or analytics and channel monitoring circuitry forming part of the system.

Exemplary technical advantages provided by processing described in connection with aspects of the present disclosure comprise but are not limited to: improving multi-path routing of media data for electronic communications; application of novel processing operations that transform applicable computing devices to execute media management decisions thereby improving processing efficiency when managing media data during a communication as well as improve communication quality; and an ability to automatically initiate hand off of communications between disparate communication channels including relative to demands of SaaS applications/services (e.g., cloud-based communication applications/services). Further, certain aspects provide advantages in terms of; providing management of contextual data useful for generating exemplary media management decisions such as actual or anticipated location information of an endpoint device; QoS parameters; user profile data (e.g., user preferences); historical usage data; and user feedback.

In certain more specific examples, embodiments include an improved GUI for applications/services through provision of GUI features/elements that enable control over media management decisions including users-specific preferences and user feedback (e.g., provided through SaaS applications/services such as a cloud-based communication applications/services): generation and provision of GUI notifications including those derived from exemplary media management decisions; improved processing efficiency (e.g., reduction in processing cycles, saving resources/bandwidth) for computing devices (e.g., servers and client computing devices) used for provision and/or management of electronic communications; reduction in latency experienced through applicable applications/services (e.g., SaaS applications/services including cloud-based collaboration applications or services) when managing electronic communications including mitigation of potential connectivity issues; improved accuracy and precision in detecting potential connectivity issues; improved usability of applications/services (e.g., SaaS applications/services) for management of electronic communications; and improved user productivity when using application/services to conduct an electronic communication, among other technical advantages.

Turning now to the figures, FIG. 1 shows a block diagram of one of various types of exemplary systems involving a data-communications server 110. The data-communications server 110 may, in some instances, be implemented as one or more communicatively-integrated servers on the side of the service provider and, in some instances, also involving one or more servers on the client side such as client-specific client server(s) 123 operated specifically on behalf of Client B (e.g., in which client server(s) 123 are configured with a client-specific database to facilitate local operations such as routing calls (e.g., as indicated by client-configurable extensions)) for endpoint devices of Client B.

As depicted in FIG. 1, first and second sets of endpoint devices are shown as being respectively associated with equipment 113 of Client A and equipment 115 of Client B, and the data-communications services, typically provided over one or more data networks (114, 114', etc. of Client A and 116, 116', etc. of Client B) are established via channels selected from among disparate channel types used for a last-segment channel connection as is accessible to an endpoint device through edge servers 121 and 121'. The edge servers may refer to or include one or more different types of media servers (e.g., Internet Protocol (IP) server, GSM-type base station, etc.). In FIG. 1, for one of the endpoint devices 118, 120 and 122 associated with Client A, last-segment channel connections are depicted as 117 and 117' and, for one of the endpoint devices 124, 126 and 128 associated with Client B, last-segment channel connection are depicted as 119 and 119'.

As shown in FIG. 1, other embodiments may be directed to methods for using data-communications systems which provide call-center and routing services such as features referring to or including some previously-available functions including one or more of Voice over Internet Protocol (VOIP), emails, chat, virtual office, multi-party conferencing, file sharing and various other features such as those associated with 8×8 Work® and available on a server on the provider side of the system (e.g., as may be commercially available from 8×8, Inc. for providing services to client entities over the Internet). Other or more specific services available from 8×8, Inc. include, for example, bi-directional collaborative environments between different (e.g., disparate) chat rooms (e.g., communication platforms), formation of communication bridges from one such chat room to another (disparate) chat room. Access to such services may be commercially available (e.g., by subscription) to individuals and enterprises alike. For further information regarding such system aspects, which may be used with and the example embodiments illustrated herein (including that which is shown in FIG. 1), reference may be made to U.S. Pat. Nos. 10,594,502 and 10,659,243 (regarding collaborative environments between different chat rooms), and U.S. Pat. Nos. 11,044,338, 11,025,488 and 11,070,640 (regarding analytics modules and related aggregation, AI-machine learning and recognition of context information for user-data communications); each of these patents is hereby incorporated by reference specifically for the respective disclosures regarding system implementation (being combinable with the types of example systems as illustrated in FIG. 1 and for the functions specifically noted above by way of the preceding discussion and parentheticals.

The lower portion of FIG. 1 illustrates, in block diagram form, one of various exemplary ways in which the data-communications server 110 may be implemented for intelligently managing use of the disparate last-segment channels 117, 117' and 119, 119' for use by one or more of the endpoint devices 118, 120 and 122 of Client A and the endpoint devices 124, 126 and 128 of Client B. Such a system as in FIG. 1 may also include the data-communications server 110 being implemented as a server arrangement (including multiple CPU-based data-communications servers) configured to provide VoIP communications and/or other types of communications and communications-related services for the endpoint devices.

The data-communications server 110 may include one or more processing circuits configured to implement client-specific control engines (e.g., client servers with database such as 123 of FIG. 1), which are configured to adjust the communications services provided for each client account according to a respective set of control directives. For instance, the client-specific control engines may adjust routing of a VoIP communication for a client account by generating client-specific sets of control data to the data communication server. Also, different embodiments may implement the client-specific control engines in various locations. For example, client-specific control engines for one or more client accounts may be implemented in a central server connected to, or incorporated with, the communication server(s). Additionally or alternatively, one or more client-specific control engines may be implemented by one or more processing circuits maintained by the client (e.g., server/database). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of remote services including, for example, VOIP communication services such as VoIP calls, audio and/or video conferencing, private branch exchange servers, packet switching, chat, and traffic management as well as non-VoIP services including, but not limited to, website hosting, remote data storage, remote computing services, and virtual computing environments. One or more of such services may be provided, for example, by a cloud computing network having one or more servers configurable for a plurality of clients.

The endpoint devices are circuit-based instruments that are used by personnel (or users) and in some instances they include VoIP-enabled circuitry (e.g., IP phones, smart phones, and/or desktop computers with appropriate VoIP software applications) and/or non-VoIP endpoint devices (e.g., plain old telephone service (POTS) telephones and cellular-communication-capable devices). Each endpoint device may be respectively associated with an account of a respective client. Endpoint devices may be associated with a particular client account by registering the endpoint device with a particular client account (as may be processed by the communications server), as may occur with a communications service subscription between an individual (or company) and a service provider such as the instant assignee (8×8, Inc.). Registered devices for each client account may be listed in a respective account settings file (or user profile) which may be stored by the data communication server(s) and/or the endpoint device.

As depicted in a particular example and shown in FIG. 1, the data-communications server 110 may include processing circuitry 140, a service provider database 142 and as may be useful in some instances, a cache memory circuit 144 for fast access to data anticipated as being regularly accessed. The cache memory circuit 144 may be particularly useful, for instance, for accessing certain user-profile data in response to a call request involving an endpoint device of Client A, where the user-profile data may include information regarding a user's preferences for certain channels depending on the user's location at the time of the call, user-specific or endpoint-device-specific preference data for certain types of calls (e.g., involving sensitive data as indicated by certain phone numbers or endpoint-device ID numbers), for accessing and/or monitoring channels which may be available to one of the endpoint devices, and/or for re-registering and re-logging in the endpoint device to use an additional one of multiple channels available by the endpoint device.

The processing circuitry 140 of FIG. 1 may include any one or more of various exemplary circuit-based modules (e.g., routing circuit 152, connection monitor 154, analytics circuitry 156 and feed/feedback circuitry 158) for deciding how to intelligently manage and control selection of the disparate last-segment channels for use by one or more of the endpoint device(s) of Client A and/or the endpoint devices of Client B. Each of these exemplary circuit-based modules is discussed further in the discussion below. In other examples, the edge server includes connection monitor circuitry (not shown) and is configured by the provider server with decision-making programming so as to enable the edge server to intelligently manage and control selection of the disparate last-segment channels for use by one or more of the endpoint devices.

Example uses such a system as in FIG. 1 may involve an incoming call, as received by the server 110, wherein the call may be initiated by one of the endpoint devices of Client A or Client B, or by another party, for reaching a targeted user. In such examples, the targeted user may or may not be one of the other endpoint devices of Client A or Client B. In another example, each of one or more such client entities (e.g., Client A) may refer to a single endpoint device as used by one individual and/or multiple endpoint devices as used by a related group of individuals (e.g., related in a context of household, a partnership, a franchise company, and/or a larger company). Where many endpoint devices are used by a relatively large group of individuals (e.g., a large company), as an optional feature of the system shown in FIG. 1, a local client-specific and client-side server such as server 123 of Client B may be used to facilitate local configurations and other client-specific aspects such as control, file-privacy features, local data backup, etc.

In connection with one such example operation of the system as in FIG. 1, consider an incoming call, as received and routed by the routing circuit 152 of the server 110, from the endpoint device 118 of Client A to the endpoint device 124 of Client B. For one or both of the last-segment connections provided by edge media servers 121 and 121', the server 110 may direct the endpoint device 118 of Client A to use selected portions of the media respectively from a primary network connection 117 and from a secondary network connection 117' and/or similarly direct the endpoint device 124 of Client B to use selected portions of the media from a primary network connection 119 and a secondary network connection 119'. Whether for the endpoint device 118 of Client A or endpoint device 124 of Client B, the portions of media in the routed call may be selected, for instance, based on a monitoring circuit (as may be part of or external to the system of FIG. 1) indicating that a QoS parameter associated with certain packets in the primary network connection 119 have degraded and that corresponding (duplicative) packets from the secondary network connection 119' should be used instead.

For each such endpoint device involved with such a selection, the routing circuit 152 may direct the endpoint device to use a secondary network connection (e.g., from among one or more of a plurality of available secondary network connections) based on data input from one or more sources. In various examples also in accordance with the present disclosure and as shown in FIG. 1, the selection implemented by the routing circuit 152 may be based on input from one or more of the connection monitor 154, the analytics circuitry 156, the feed/feedback circuitry 158, and/or stored user-profile data as may be stored in the provider database 142, in the cache memory circuit 144 and/or in a database associated with or part of the client server (e.g., 123 of FIG. 1). As stored for a given endpoint device, the user-profile data may be particular to one or more users of the endpoint device and/or an identifiable client entity associated with one or more users of the endpoint device, and/or to an identifier associated with the endpoint device and one or more other endpoint devices linked to the endpoint device.

As identified in the foregoing description, the present disclosure describes generation of exemplary media management decisions. Exemplary media management decisions may comprise but are not limited to: 1) a decision as to whether to combine media data from the primary and secondary network connections; and 2) a decision to modify a state of media data transmission relative to network connections (established or otherwise proactively) to enhance multi-path communication routing by improving communication quality and redundancy of a communication (ongoing or anticipated). A media management decision of the present disclosure is generated based on one or more of various factors as may be configured by the service provider for the benefit of the endpoint device, including but not limited to: actual/anticipated location transition (e.g., of an endpoint device such as a client computing device); QoS evaluations relating to a quality of network connection(s) that are used for a communication (ongoing or anticipated); and/or other contextual data including review of user profile preferences for management of media data (e.g., user profile of an application/service, historical usage data, log of historical network connections), and/or user feedback such as that which may be received via graphical user interface (GUI) interactions with a user of an application/service (e.g., a SaaS application/service such as a cloud-based communication application/service).

A pre-selected media management threshold is criteria setting utilized to aid generation of a media management decision. A pre-selected media management threshold is set for evaluating contextual factors, relative to acceptable thresholds, pertaining to media management decisions. In implementation, an exemplary threshold may be qualitative, quantitative, or a combination thereof. For instance, the value of a threshold may be dependent on the type of factors used to generate specific media management decisions. On behalf of specific clients, or generally, developers may configure a set of pre-determine criteria for system-implemented media management decisions using one or more of the contextual factors referenced in the present disclosure. In alternative examples, factors used to generate a media management decision are determined in real-time, which may also include real-time (or near real-time) setting of thresholds for threshold evaluation pertaining to media management decisions. In examples where a pre-selected threshold is qualitative, said threshold may be a binary value (e.g., yes/no, good/bad) as to whether a parameter is satisfied. In examples where a pre-selected threshold is quantitative, developers may set specific numerical values (e.g., numbers, percentages) or ranges of numerical values for said threshold. Moreover, it is to be recognized that developers can set thresholds and conduct threshold evaluation in any known manner without departing from the spirit of the present disclosure. For instance, threshold satisfaction may be determined based on any type of equality expression including but not limited to certain boundaries established relative to one or more given thresholds; these boundaries including among other examples: equal to the threshold(s); less than or equal to the threshold(s); greater than the threshold(s); and greater than or equal to the threshold(s).

The above feeds and/or circuit-based modules may be used together or individually. As one example, the connection monitor 154 may be either an individual source of information for the selection and/or decision of which last-segment channel to use. In this regard, the connection monitor 154 may be configured to sample and/or regularly monitor certain of the last-segment media channels available for connections between the endpoint device to be connected by a respective one of the edge servers (e.g., endpoint device 118 and edge server 121 of Client A, or endpoint device 124 and edge server 121' of Client B). In a more specific example, if the connection monitor 154 detects that the one or more available connections is appropriate for the primary last-segment connection and/or one among a set of secondary last-segment connections, the processing circuitry 140 may then access the stored user-profile data, associated with the endpoint device for the connection via the respective edge server (e.g., endpoint device 118 and edge server 121) and, based on particular data or information in the stored user-profile data, the primary last-segment connection is selected or, in some instances where the connection is already established, these feeds and information sources may be used to select and establish the secondary last-segment connection.

As another specific example, the analytics circuitry 156 and/or feed/feedback circuitry 158 may be used as a data source for the routing circuit 152 to select one of the last-segment connections (as an instruction or suggestion to the endpoint device) for the incoming call. In this example, such circuitries may provide information which need not necessarily require the connection monitor 154 to confirm that each possibly-available last-segment channel has a current acceptable signal quality. For instance, for a given Client entity (e.g., Client A) or endpoint device or user of the endpoint device, the processing circuitry 140 may assume (e.g., based on a separate feed from module 158 or user profile data), that acceptable signal quality is available for use of one or more previously-identified last-segment channels; and consequently, the routing circuit 152 may select any or a preferred one (as indicated by the user profile data) of the last-segment channels and faulty portions of media in the one of the network channels may be replaced by using corresponding (duplicative) packets from the other redundant network channel. In a related example, the connection monitor 154 may also be used to confirm that a preferred one of the channels has a current acceptable signal quality, in combination with other considerations and/or parameters, before such selection of one of the last-segment channels is made for the incoming call.

In connection with the above and other examples, one or more of the connection monitor 154, the analytics circuitry 156, the feed/feedback circuitry 158, and/or such stored user-profile data may be used in combination with user-related calendar information before such selection of the last-segment channel is made for the incoming call. The user-related calendar information may include user-specific events as pre-recorded on a calendar associated with the user of the endpoint device. The types of calendars and calendar-related information may vary. As examples, the calendar may be any one of or an aggregation multiple calendars such as two or more of: a private calendar; a work calendar; a group calendar; a public calendar with or notice of events nearby the endpoint device or the user; a communicated email with an event invitation and a public calendar indicating events (not necessarily nearby) which may affect the endpoint device's access to a preferred one of the last-segment channels at a particular date, time and/or place (aka "geo-temporal situation") and/or a high-attendance event in which access to certain preferred last-segment channel or channels with high signal quality may be difficult.

A user profile may be associated with a SaaS application or service (e.g., 8×8 Work) that is configured to provide functionality for management of cloud-based communications via desktop and/or mobile applications/services. In some examples, historical usage data (e.g., historical log of network connections, past media management decisions) pertaining to a specific user (or group of users) may be utilized to generate real-time (or near real-time) media management decisions when a user is involved in an electronic communication via a SaaS application or service (e.g., a cloud-based communication application/service). In one technical instance, media management decisions may be generated based on said historical usage data. In other examples, other contextual factors as described herein may be applied to generate more accurate media management decisions in aggregation with historical usage data or in lieu of. In further examples, user profile preferences may be utilized to generate contextually relevant media management decisions. To improve operation during real-time (or near real-time) communications, exemplary SaaS applications/services may be adapted to enable users to enter, via an adapted GUI, preferences pertaining to usage and/or handoff of disparate networks relative to a connection of a communication. As an example, an adapted GUI of an application/service is configured to enable users to select a priority or order for application of different networks/communication channels for example, to support multi-path routing and improve quality of communications. In further examples, users may wish to set rules or parameters pertaining to usage of different networks (and associated network connections) or communication channels during an ongoing communication. A GUI of a SaaS application/service (e.g., a cloud-based communication application/service) is adapted to enable users to set rules/parameters pertaining to media management decisions. For instance, users may desire to set a preference for use of their cellular network to establish or maintain a connection to a communication (e.g., via a SaaS application/service). Exemplary preferences may be set specific to different types of networks, thresholds pertaining to usage of a specific network (e.g., usage of cellular minutes; usage windows specifying time(s) of day to for application of network; and preferred order of application of network options). This may aid determinations as to when to automatically apply actions derived from media management decisions including control over when (and how long) to apply redundancy of network connections (e.g., if redundancy is not immediately required).

Additionally, users may be presented, via a GUI of SaaS application/service, with control over preferences that are determined based on network usage as determined via usage of a SaaS application/service. For instance, preferences for media management decisions may be derived from analysis of historical usage patterns of a user (or group of users), whereby users can review pre-determined usage preferences and adjust their user profile accordingly. Additionally, data insights pertaining to media management decisions may be generated and rendered for users via a GUI of a SaaS application/service. Historical usage patterns, including historical logs of network connections, can also be used as a basis to effect automatic processing determinations (e.g., server-side) based on decisions made as to whether to combine media data from the primary and secondary network connections or otherwise modify a state of redundancy of network connections to support quality of a communication. Furthermore, SaaS application/services may be adapted to enable users to enter and manage preferences for media management decisions during a communication and/or subsequent handoff of a communication (e.g., such as when a sufficient QoS level is determined for a preferred network).

Depending on the particular data available to the processing circuitry, the preferred last channel(s) and the geo-temporal situation may be assessed by the analytics circuitry 156 and/or indicated by the feed/feedback circuitry 158 to receive a separate line of communication from a third party or a client-server associated with user of the endpoint device (or the endpoint device). In response to the routing of such an incoming call to the selected last-segment channel or channels, the processing circuitry 140 may update the user-profile data to bias, or providing weightings, to indicate likelihoods that the user and endpoint device would have certain expectations of success realized by using certain of the channels at certain times of the day and/or around certain regions in proximity to one or more edge servers typically used with the endpoint device.

In yet another specific example, at least one QoS-related parameter involving the secondary network connection is assessed (e.g., by the connection monitor 154 or a separate input provided to feed/feedback circuitry 158 of FIG. 1) along with information for identifying an anticipated location transition of the endpoint device (e.g., as when a user may carry the endpoint device from the main part of the house to the garage, or transition between floors of an office building). In response to the anticipated location transition and the QoS parameter being above a certain threshold, choosing to use media of the incoming call (e.g., as may be implemented by the media server or the endpoint device) from the one of the disparate networks as a last-segment media channel may be initiated or terminated since the corresponding last-segment media channel may have a history of being faulty in or nearby certain locations. Various examples of such QoS-related parameters may include bit-error rate indicators, Received Signal Strength Indicator (RSSI), or signal strength alone. However, some solutions propose using other parameters like Received Signal Strength Indicator (RSSI) signal strength, Real-Time Transport Protocol (RTP) packet loss rate, packet sequencing, jitter which is a measure of variability of observed packet timing in the context of RTP, and round-trip delay time.

Further examples of the present disclosure extend to generation and rendering of GUI notifications relative to media management decisions. A GUI of a SaaS application/service (e.g., a cloud-based communication application/service) is adapted to enable management of such GUI notifications. As an example, the data-communications server 110 may be further programmed to execute determinations for generation and provision of exemplary GUI notifications. In doing so, the data-communications server 110 interfaces with described endpoint devices, which comprise processing capabilities and a user interface to enable rendering of GUI notifications via a GUI of a SaaS application/service where a representation thereof is rendered on a client computing device. Generation and rendering of GUI notifications occurs relative to media management decision such as: 1) a decision as to whether to combine media data from the primary and secondary network connections; or 2) a decision to modify a state of media data transmission relative to network connections (established or otherwise proactively) to improve communication quality and redundancy of a communication (ongoing or anticipated). In some examples, GUI notifications of the present disclosure may comprise data insights relative to media management decisions. For instance, a GUI notification may provide data insights derived from media management decisions, where a GUI notification may be generated and rendered to inform a user with regard for how media is being managed relative to a communication (e.g., application of one or more network connections, state of applied network connections, etc.). In other instances, GUI notifications may provide users with data insights pertaining to contextual data that aids in generation of media management decisions including but not limited to: user profile settings, historical usage data and/or user feedback previously received relative to media management decisions. In further examples, GUI notifications may include actionable GUI elements that enable users, via a client computing device, to provide user feedback for media management decisions. A GUI notification may comprise a selectable GUI element that enables users to, among other examples: accept/reject a media management decision, undo an automatically applied media management decision; and provide user feedback pertaining to media management decisions or settings for a user profile of an application/service. In at least one example, exemplary media management decisions occur based on threshold determination(s). For instance, if a first pre-selected threshold is satisfied, a state of network connection(s) may be automatically updated. If a second pre-selected threshold is satisfied, a GUI notification may be automatically generated and rendered for a user to provide feedback as to whether to update the state of network connection(s). In examples where GUI notifications are generated and rendered, it is to be recognized that processing for generation and rendering of GUI notifications may occur via one or more server-side computing devices, one or more client-side computing devices or a combination thereof. In one example, a GUI notification may be generated and transmitted by a network server and subsequently received at a client computing device for rendering. In another example, computing instructions may be transmitted (e.g., from a server-side computing device) to a client computing device for generation and rendering of a GUI notification.

For context, a non-limiting example is now described. A user may be connected to a call communication, via a cloud-based communication application/service, using a preferred communication network connection (e.g., Wi-Fi). During that call communication, automatic processing occurs to evaluate a contextual state of the call communication, where a decision may be made as to whether (or not)

to combine media data from the primary and secondary network connections. For instance, a secondary network connection may be a cellular network associated with a user that is a registered user profile of a cloud-based communication application/service. Said decision as to whether to combine media data from network connections (e.g., for redundancy) is determined based on processing described in the present disclosure. That is, or more contextual factors associated with media management decisions are applied and evaluated (e.g., using threshold evaluation) to generate a media management decision. In one technical instance, a result of a media management decision is execution of an automatic action to combine media data from the primary and secondary network connections thereby creating redundancy for a quality of an electronic communication. In some other technical instances, a media management decision results in generation and rendering of a GUI notification which may be presented via an endpoint device (e.g., client computing device). For instance, a GUI notification may be rendered on a users' endpoint device via a GUI representation of the cloud-based communication application/service. However, it is to be recognized that a GUI notification can be rendered on any user endpoint device for full contextual handoff and management of an electronic communication. An exemplary GUI notification may be informational and provided in additional to (or after) an automatic action has been applied. In alternative, examples, an exemplary GUI notification may comprise a GUI element that enables a user to execute action(s) with respect to a media management decision. In some instances, a GUI notification may pertain to provision of user feedback and/or setting of user profile preferences for media management decisions.

Often times an electronic communication is ongoing after an initial media management decision is determined and applied. Subsequent contextual analysis of a quality of the communication may be further programmed to occur (e.g., at predetermined time intervals thereafter), where applied network connection(s) (e.g., the primary and secondary network connections) may be evaluated. This enables continuous managing of quality of a communication as well as improvement in processing efficiency and/or adherence to user preferences for media data management. Subsequent contextual analysis may be programmed to occur while an electronic communication is ongoing, after the completion of the electronic communication or before the occurrence of an additional electronic communication. Continuing the above example, a primary network connection may be a user's Wi-Fi connection, and a secondary network connection is a cellular network. Application of a user's cellular network may result in usage of data, minutes (e.g., associated with a calling plan), and/or additional pricing considerations. As such, it is optimal to continuously monitor whether a user's cellular network should be applied to support an ongoing communication and/or if that network connection should be replaced with another viable option to support redundancy if required by an application/service (e.g., a cloud-based communication application/service). It follows that the present disclosure is intended to cover technical instances where continued evaluation of a network state of an electronic communication can result in real-time (or near real-time) update of applied network connections for management of media data. For instance, application usage of a network connection (e.g., a cellular network) can be added/removed or paused/resumed based on evaluation factors such as: actual/anticipated location transition; QOS evaluations relating to a quality of a network connection (before, during or after initiation of a communication); and/or other contextual data (e.g., review of user profile preferences, historical usage data (e.g., log of historical network connections), and/or user feedback). In some examples, results of a media management evaluation can be automatically applied and in other instances GUI notifications (with GUI elements enabling action to be taken) may be generated and rendered via client computing devices to provide user control over media data management.

FIGS. 2A-2E are respective flow diagrams illustrating example approaches involving registration and activation of endpoint devices for managing redundant last-segment channel connections as may be used with a system of the type depicted in or consistent with the system aspects of FIG. 1, in accordance with the present disclosure. As mentioned above, certain exemplary aspects of the present disclosure may be useful in overcoming or at least mitigating call degradation when there are handoffs and other types of interference of communications between different types of networks (and different incompatible networks of the same type such as two incompatible Wi-Fi networks) including but not limited to cellular and Wi-Fi networks. As in the aforementioned example, even a slight interruption of audio or data (generally "media") in connection with the call may result in the user at the receiving end of the call noticing a gap in the audio user and/or losing valuable information. For example, when a call (via a last-segment connection) involves sharing or streaming data and the connection would experience a handoff or some form of interference, important data may be lost in the communication.

In this context, aspects of the present disclosure involve use of a redundant channel being set up between the endpoint device and the edge server with the redundant channel being redundant in that it passes media of the call in a manner that is duplicative of one of the networks. Consider, for example, a handoff from a Wi-Fi network channel to a cellular network channel. Before the handoff, a redundant channel is set up between the endpoint device and the edge server, and this may be done by an effective pre-registration of the endpoint device to set up the redundant channel, via another one of the disparate channel types, to prevent the loss of data packets in the call. When the call is handed off from the Wi-Fi network channel to the cellular network channel, for any media (e.g., data packets) which are detected as being degraded in quality during the handoff, the corresponding data packets may be obtained from the redundant channel and combined by processing circuitry at the edge server or on the provider-server side of the edge server (e.g., by the provider-server side or the edge server).

Such above-described aspects may also address other issues. As an example, one issue is when the user is trying to experience a quality audio call through use of a mobile app, and the mobile app typically just gets either Wi-Fi or cellular data (e.g., LTE, 3G, 5G) depending on whether Wi-Fi is first recognized as being available; by default. In this instance, the operating systems of certain smartphones would likely select a channel from a Wi-Fi network as the default even though it uses more data, consumes more battery power and may have historically been associated with more dropped packets than a cellular network also available to the user's mobile.

Figure 2A:
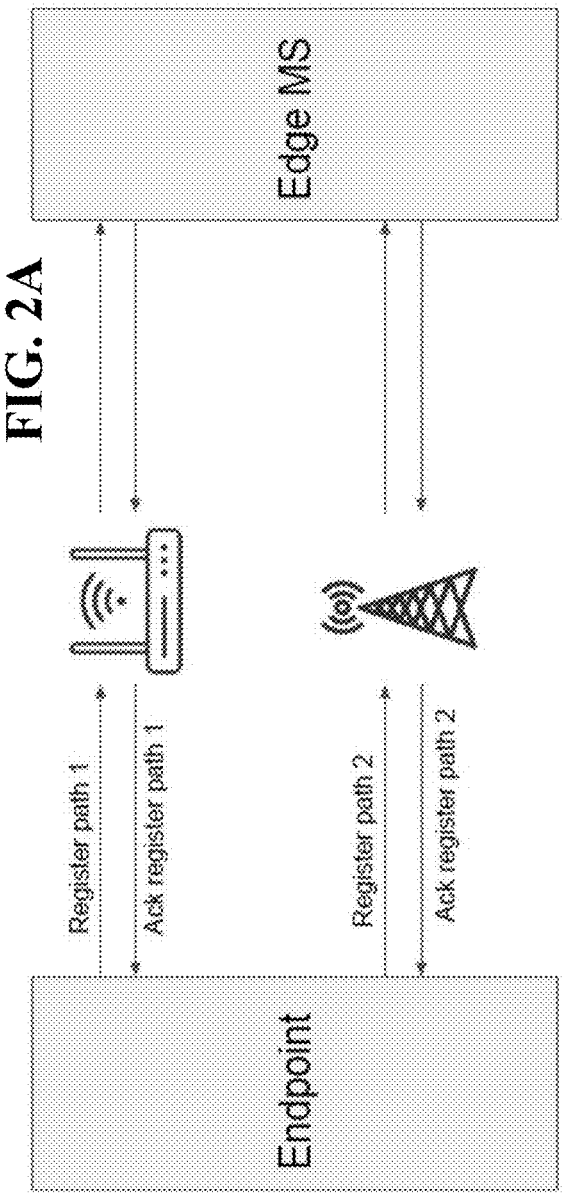

FIG. 2A shows one example of media path registration wherein the endpoint registers itself via each of the last-segment-channels with the edge media server ("Edge MS" as in FIGS. 2A-2E), and the set of last-segment channels includes at least one redundant media path. The act of registering a media path does not mean the path will be used, only that it is available if and when required. Path 1 of FIG.

2A may be deemed a default path and generally will usually always be active for passing media to and from the endpoint device. The particular default path may be selected by a setting configuration in the endpoint (e.g., under a settings feature associated with the data communications service in the system depicted in FIG. 1), or with permission of the associated user or client entity. The default path may be set or reestablished via the user profile, or by one or more aspects within the processing circuitry (e.g., modules 154, 156 and 158).

Path 2 of FIG. 2A is considered to be the redundant path, and once the redundant path is readied via the endpoint device being registered, the redundant path is activated and then used as a media channel (e.g., with the edge server combining data packets from both paths to minimize QoS issues) when desired or as appropriate for the situation. As non-limiting examples, the activation of path 2 might be: always, only when the connection monitor 154 detects that current and/or expected network conditions are poor enough to warrant activation such as when a threshold for a QoS parameter or criteria is transgressed; and when the processing circuitry 140 detects or predicts that the location of the endpoint device, involved in a current and/or expected call, mandates a change from the default path to a particular redundant path. For example, the processing circuitry 140 may use the connection monitor 154 (e.g., with QOS feedback from the edge server) and/or the analytics circuitry 156 to detect and/or predict that the location of the endpoint device, involved in a current and/or expected call, merits a change from the default path to a particular redundant path.

In this latter example situation, the analytics circuitry 156 may be configured by the client entity to track habits of the user of the endpoint device including, as examples, common movements between locations. Consider the following types of movements which may be common for certain endpoint device users. First, movements between the home and the workplace (in one or both directions) may commonly occur at particular times of the day and on particular days of the week. For tracking these movements, the processing circuitry 140 and/or the endpoint device may track the user from the endpoint device itself by way of conventional GPS-location tracking, and/or from separate tracking feeds (e.g., via module 158 of FIG. 1) such as frequent registrations at edge servers. In certain examples, the analytics circuitry processes these movements over sufficient time and over sufficient occurrences (e.g., daily during certain working-hour shifts and over several consecutive weeks) and then prompts the client entity or user (e.g., via the endpoint device) with such a suggestive query to ask permission to establish a redundant media path and/or change the user profile so as to set or update the identity of the default path in accordance with these perceived habits and for the times indicated.

In other examples, the analytics circuitry processes these movements to recognize or anticipate that, although occurring at an irregular day and/or time, a particular condition occurs so as to prompt a change as to the identity of the default path in the user profile or to prompt a temporary change for establishing use of a particular one of available redundant media paths. The particular condition may be, as examples: recognition of movement toward an area where a poor QoS would be expected; stepping into an elevator, garage or car where another network with a stronger signal or improved QoS parameter is or will soon be available; movement to or toward a location where congestion on one network may be expected or where a security risk, demands consideration of the change, and other types of anticipated location transition.

In a more specific example, a security risk may occur relative to contexts detected in the call. Such a call-related context may be discerned by the processing circuitry 140 of FIG. 1 (e.g., via the analytics circuitry 156) which may be configured to aggregate words used in calls over time and categorize current calls with a scale or weighting system. As examples, certain words or terms detected in the call (e.g., HIPAA, invention, liability, cost analysis, strategy and trade secret) may provoke the analytics circuitry to assign a high risk value to the current call, and these words or terms may be pre-programmed by the service provider or the client entity, learned by the analytics circuitry, and/or received from a third party through the feed & feedback circuitry (e.g., 158 of FIG. 1). In a more particular example, consider a situation where a public Wi-Fi network is being used for the current call, detection of any such words, or terms or an assigned high risk value to the current call, may be used as a threshold criteria to prompt the user of the endpoint device (or, if the client entity so permits via the user profile and/or user settings), to force the endpoint device to switch to the secondary path so that it no longer uses the public Wi-Fi network as the last-segment connection. With such a situation, the provider-server may signal to the user's endpoint that the switch should be made and concurrently, the provider-server may set up a redundant media channel (with or without prompting the user via the endpoint device) to preserve the quality of data during the call switch. Accordingly, in different instances, one or multiple situations can prompt a change of the default path and/or a change from the current path as the last-segment connection to the secondary path, and the provider-server may set up a redundant media channel to optimize call quality as discussed above by combining high-quality data packets from the media so as to facilitate a non-interrupted, high-quality connection.

For each of these above examples, the media path registration of FIG. 2A may use a protocol as illustrated so as to include the endpoint device registering itself via path 1 (e.g., as the default path), with path 1 being readied for use to pass media once the edge MS conveys an acknowledgement back to the endpoint device and to set up a redundant media channel to optimize call quality. A similar handshake occurs for with path 2. As illustrated in this example (for discussion purposes only), path 1 may involve an IEEE 802.11 type router for use in a Wi-Fi network, whereas path 2 may involve a cellular base station for use in a cellular network (e.g., LTE, 4G, 5G, GSM).

The examples discussed below may also be driven by same types of feeds, modules and circuits as discussed above in connection with FIG. 2A (e.g., with or without use of a user profile).

Figure 2B:
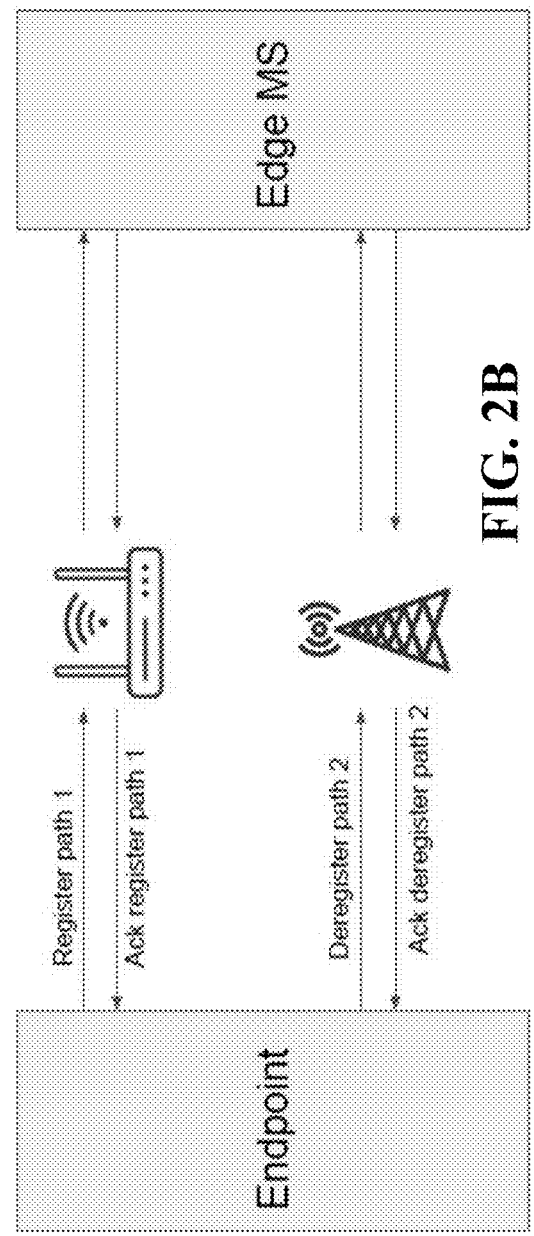

FIG. 2B shows an example of media path deregistration, also in accordance with the present disclosure. In this example, the endpoint device may deregister a registered media path if the processing circuitry decides this media path is not an acceptable potential path for media traffic. For example, the endpoint device (of the processing circuit 140 on behalf of the endpoint device) might decide to deregister the redundant mobile data path (path 2), relying only on the available Wi-Fi path (path 1). Media path deregistration may occur over any path, allowing a client to remove a path that is no longer available and to activate a path that is still available (e.g., if path 2 suddenly becomes unavailable/disconnected, the client may send the deregister path 2 transaction over the path 1 channel).

Figure 2C:
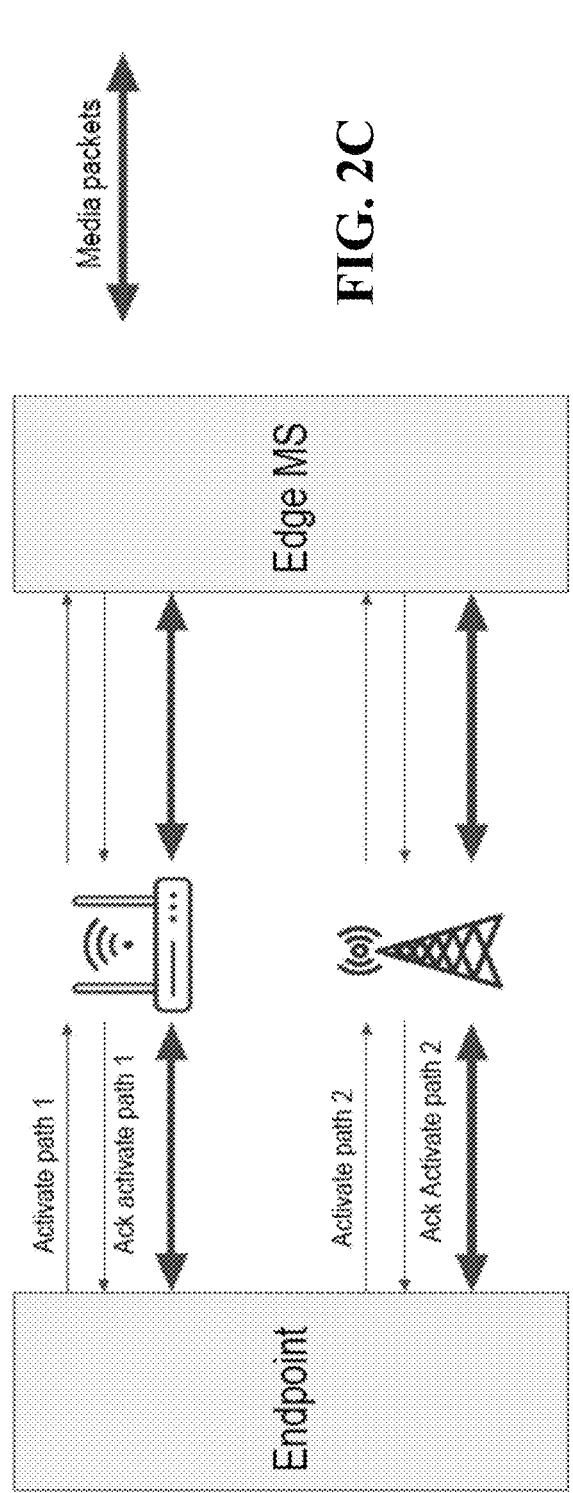

FIG. 2C shows an example of media path activation by an endpoint device. The endpoint device activates a path by sending an activation request to the edge MS upon deciding to use the path. Once this activation transaction is completed (the edge MS acknowledges the request), the path is considered active and media can be sent over the path in both directions. Consider an example in which the endpoint may activate redundant path 2 if the quality of the stream received by the endpoint over path 1 drops below a satisfactory level.

Figure 2D:
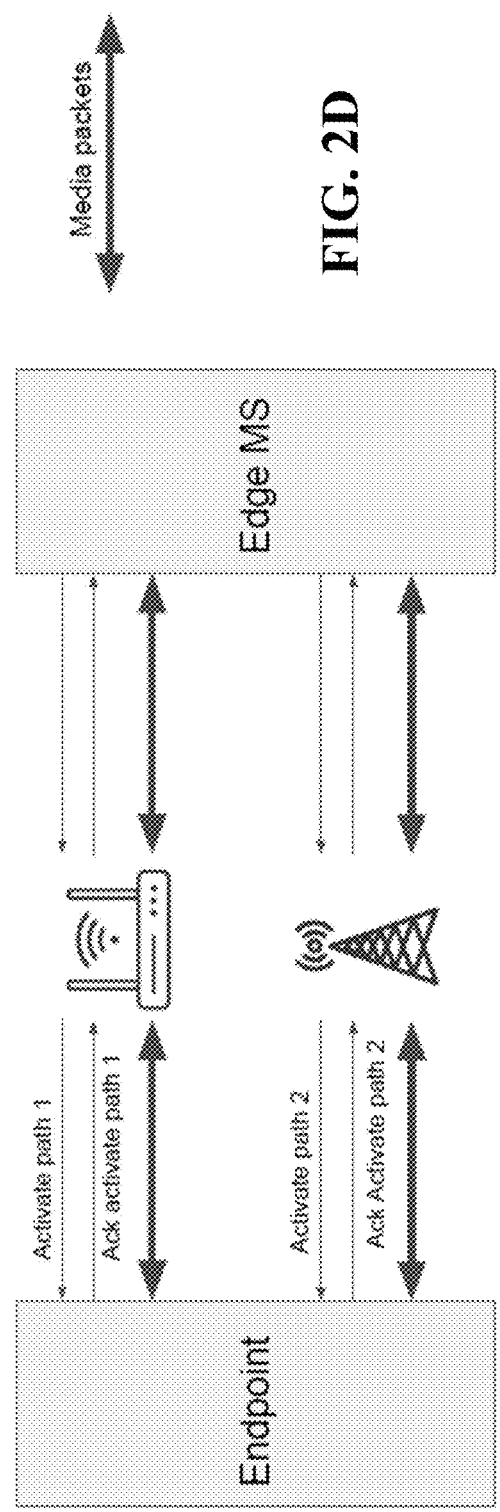

FIG. 2D shows an example of media path activation by an edge media server. In this example, the edge MS activates a path by sending an activation request to the endpoint device upon deciding to use the path. Once this activation transaction is completed (the endpoint device acknowledges the request), the path is considered active and media can be sent over the path in both directions. Consider an example in which the edge MS may activate redundant path 2 if the quality of the stream received by the edge MS over path 1 drops below a satisfactory level. Again, in the example system of FIG. 1, the connection monitor or another feed may provide such data regarding QoS parameters and/or a metric as to the quality of the stream of data in the call.

Figure 2E:
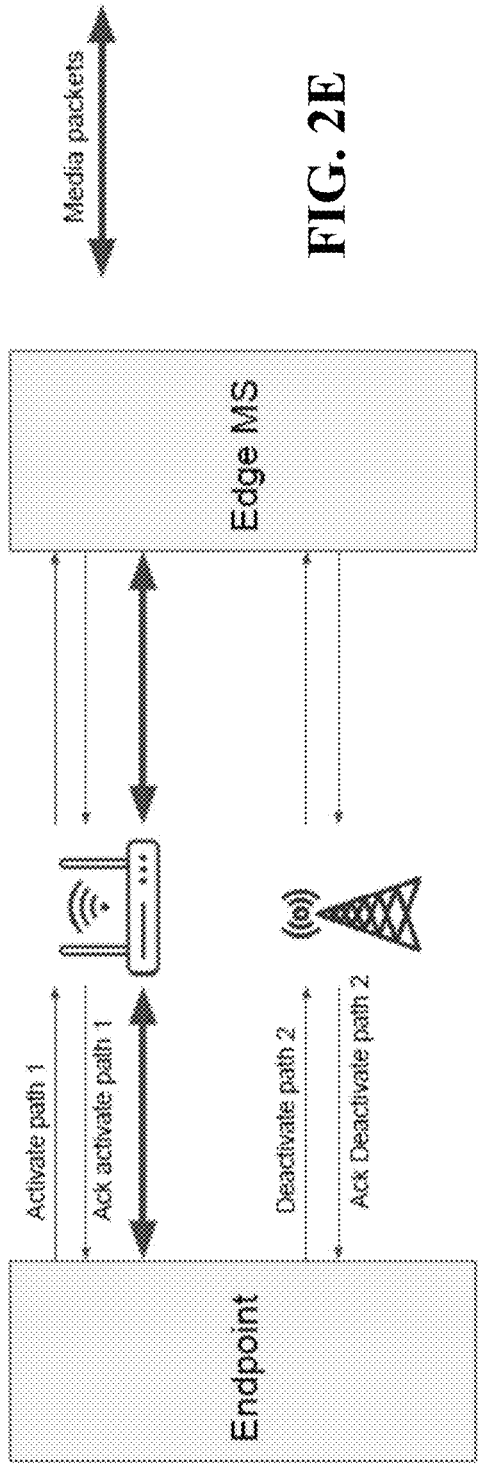

FIG. 2E shows an example of media path deactivation by either the endpoint device or the edge MS. In this example, either the endpoint device or the edge MS may choose to deactivate a path by sending a deactivation request to the other side upon deciding it no longer wants to use this path for media. If both the endpoint device and the edge MS decide the path is no longer needed (e.g., both are receiving a stream of satisfactory quality), then the path is deactivated. However, if either endpoint device or the edge MS (e.g., deciding on its own or based on input from a monitoring circuit in the server-side of the system) decide the path should remain active, then the deactivation request is denied and the path remains active. The deactivation request may be reattempted periodically until both ends of the equipment (and/or their respective users) are satisfied the path is no longer needed.

In other specific examples, media path deactivation may occur in other scenarios. One example scenario is when a client request to deactivate a path is denied by the edge MS. This denial may occur via a protocol where a Nack (negative acknowledgement or non-acknowledgement) is sent back from the edge MS or where the edge MS does not properly respond according to the protocol used between endpoint device and the edge MS. Another example scenario is when a client request to deactivate a path is acknowledged by the edge MS, such as where an Ack is sent back from the edge MS according to the protocol used between endpoint device and the edge MS.

Figure 3:
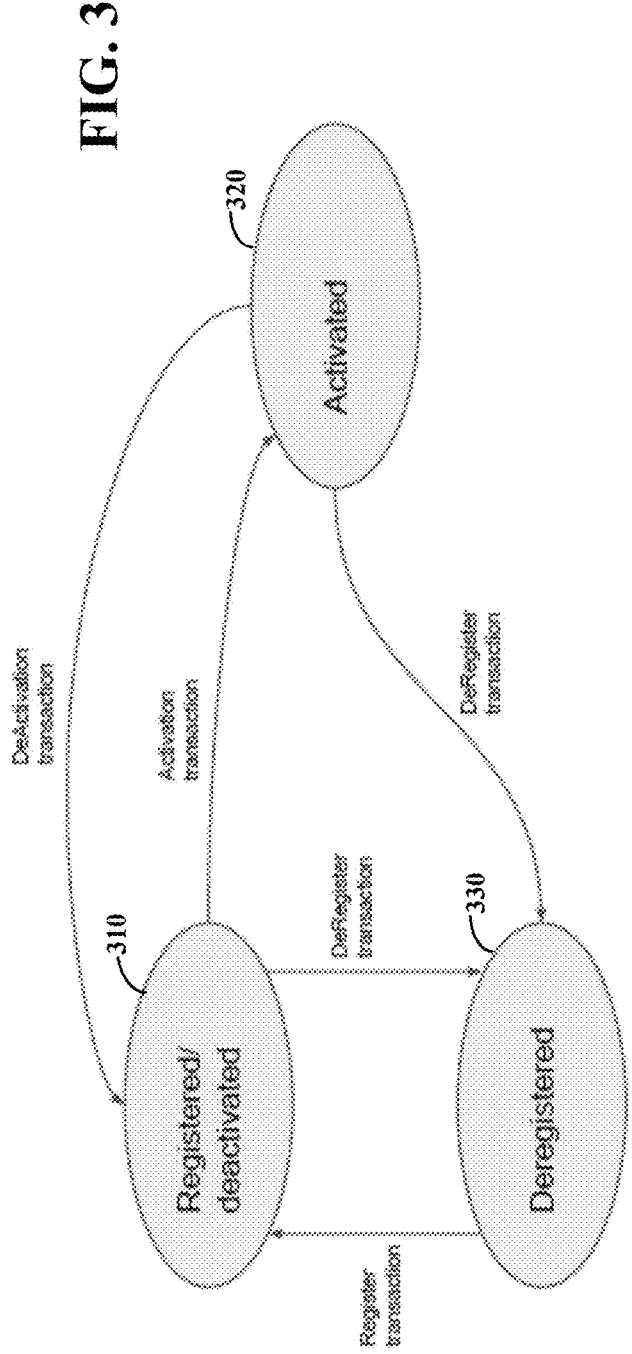
FIG. 3 is a diagram illustrating one example of path-state flows through which endpoints may be registered, deregistered, activated and deactivated, in accordance with the present disclosure.

Consistent with the above examples, FIG. 3 is a diagram illustrating an exemplary path-state flow for showing how endpoints may be registered, deregistered, activated (and deactivated), in accordance with the present disclosure, for practical uses of a redundant channel to maintain a high-quality call without interruptions in the media packets between the user's endpoint device and the edge server. Starting at state 310, an endpoint device may register itself with an edge server, as discussed above, on a primary path and, if appropriate, on one or more secondary paths which are to be used conditionally based on such actual or anticipated parameters (e.g., location, time, date, condition, etc.) and/or based on specific events occurring as may be processed by the processing circuit (e.g., 140 of FIG. 1).

From state 310, flow proceeds to state 320 or to state 330. Flow proceeds from state 310 to state 320 for an activation transaction where a selected or default path is activated for possible use by the endpoint device in passing media. Flow proceeds from state 310 to state 330 for a deregister transaction where the selected path is deregistered in connection with the various examples as discussed above.

From state 320, flow proceeds to state 310 or to state 330. Flow proceeds from state 320 to state 310 for a deactivation transaction where an activated path is deactivated so as to prevent possible use by the endpoint device in passing media. Flow proceeds from state 320 to state 330 for a deregister transaction where the selected path is deregistered again as in connection with the various examples as discussed above. From state 330, flow proceeds only to state 310 which is for a register transaction as discussed above with state 310.

As examples, the Specification describes and/or illustrates aspects useful for implementing the claimed disclosure by way of various circuits or circuitry which may be illustrated as or using terms such as blocks, modules, device, system, controller and/or other circuit-type depictions (e.g., reference numerals 140, 152, 154, etc. of FIG. 1). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing in connection with a path between an endpoint device and an edge server, path registration, path activation, or path deregistration.

For example, in certain of the above-discussed embodiments, one or more modules are discrete logic circuits or programmable logic circuits configured and arranged for implementing these operations/activities, as may be carried out in the approaches disclosed in the various examples and/or as shown in the figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with FIGS. 2A-2E and FIG. 3, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as "circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
 a set of at least one communications-provider server ("server set") to
  provide a data-communications service to a plurality of endpoint devices respectively associated with remotely-situated clients, the data-communications services being established via channels from among disparate last-segment channel types of respective networks accessible to one of the plurality of endpoint devices ("the one endpoint device") through an edge server, and
  route an incoming call involving the one endpoint device by establishing, for passing media in the call, a primary network connection and a secondary network connection via respective first and second ones of the disparate last-segment channel types; and
 connection control circuitry to
  use a scoring metric that is indicative of value concerning any of a plurality of different issues identifiable from the apparatus and/or a user profile stored for the one endpoint device and that is associated with a currently-available channel for use by the one endpoint device as a redundant connection channel for the call, and
  assess, based on at least one QoS (quality of service) parameter involving at least one of the primary and secondary network connections and an anticipated or actual location transition of the one endpoint device, portions of the media from at least one of the primary network connection and the secondary network connection, and
  in response to the assessed portions of the media, combine media packets from the primary network connection and the secondary network connection, thereby using the primary network connection and the secondary network connection as redundant media channels to facilitate the call between the one endpoint device and the edge server.

2. The apparatus of claim 1, further including analytics circuitry to predict and suggest an optimal one of the disparate last-segment channel types as a redundant channel to the endpoint device and the edge server, based on at least two of the following: the anticipated location transition, preferred channel types in a user profile, an event scheduled on a personal calendar associated with the user profile, and an event associated with an anticipated congestion of one or more of the disparate last-segment channel types.

3. The apparatus of claim 1, wherein the connection control circuitry is to combine the media packets from the primary network connection and the secondary network connection based on an endpoint-user specific profile indicating that the actual or expected location use of said one of the plurality of endpoint devices is associated with decreased QoS, in terms of latency, packet loss, or noise, of at least one of the primary and secondary network connections by said one of the plurality of endpoint devices.

4. The apparatus of claim 1, further including endpoint-user analytics circuitry to assess location transitions involving said one of the plurality of endpoint devices or a user of said one of the plurality of endpoint devices and to predict the anticipated location transition of the one of the plurality of endpoint devices for use by the connection control circuitry.

5. The apparatus of claim 1, wherein the server set is to ready the secondary network connection for the incoming call after receipt of an indication that said one of the plurality of endpoint devices has access to the secondary network connection, and wherein readying a secondary network connection initially occurs without conveying media to a user of said one of the plurality of endpoint devices.

6. The apparatus of claim 1, wherein the connection control circuitry is further to drop one of the primary and secondary network connections in response to detecting or receiving an indication that overall QoS for the call would no longer be benefited by ongoing use, involving combining of packets obtained from the primary and secondary network connections.

7. The apparatus of claim 1, wherein the server set is to effect the media of the incoming call being switched in response to a prediction that the endpoint device has a preferred or biased relationship with one of the disparate last-segment channel types.

8. The apparatus of claim 1, wherein the server set includes a provider-side server cooperatively configured with the edge server to facilitate redundant use of the primary network connection and the secondary network connection as redundant media channels indefinitely so long as respective QoS parameters associated with the primary network connection and the secondary network connection satisfy a certain threshold.

9. The apparatus of claim 1, wherein the disparate last-segment channel types include at least two of the following types of communications networks: WiFi or IEEE 802.11; cellular; DSL; and Satellite Internet, wherein the scoring metric is set based on one or more of preprogrammed data and anticipated issues.

10. The apparatus of claim 1, including a set of one or more processors as part of the one endpoint device or the edge server, and further including a non-transitory computer readable medium containing program instructions, and wherein the program instructions are to be communicated from the server set for downloading to and execution by the set of one or more processors, the program instructions are to cause the one or more processors to cooperate with the connection control circuitry in using the primary network connection and the secondary network connection as redundant media channels to facilitate the call between the one endpoint device and the edge server.

11. The apparatus of claim 1, further including memory circuitry containing a database of user profiles that are linked with respective ones of the plurality of endpoint devices, wherein the database includes, for the one endpoint device, a user profile that indicates at least one location as corresponding to specific communication networks useful as the respective disparate last-segment channel types.

12. The apparatus of claim 1, further including analytics circuitry to assess a likelihood, of a QoS degradation in a last-segment-path connection with the one endpoint device and to indicate that data communications would likely be improved through an increased use of the different one of the disparate last-segment channel types, wherein the scoring metric is set as being linked to the likelihood and being based on one or more of: signal quality, a security risk, congestion involving channel bandwidth, likelihood of having to change to yet another channel, the number or rate of recently-dropped packets, and one or more contexts regarding the call which may weigh for or against use of any one particular available channel.

13. The apparatus of claim 1, further including analytics circuitry to update a QoS database associated with a QoS-degradation record based on use of at least one of the primary and secondary network connections.

14. The apparatus of claim 1, further including monitoring circuitry to monitor a transgression of QoS in a last-segment-path connection based on one or more call-connection parameters from:
   a default parameter characterizing a pre-determined QoS connection degradation; and
   a parameter that is specified by or on behalf of a client entity associated with the one endpoint device and that is associated with a limited amount of cellular-connection experience in terms of time and/or data, or with a limited amount of WiFi-connection experience due to security risk on public WiFi.

15. The apparatus of claim 1, further including monitoring circuitry to monitor for a transgression based on one or more call-connection parameters involving a signal communicated through a transceiver of the endpoint device, wherein said one or more call-connection parameters is from among the following: a signal-strength threshold; a current location of the endpoint device; a packet-dropping criteria, a signal-to-noise indication, and a degree of packet error.

16. A method comprising:
   operating a set of at least one communications-provider server ("server set") to provide data-communications services with a plurality of endpoint devices, the data-communications services being established via channels from among disparate last-segment channel types of respective networks accessible to one of the plurality of endpoint devices ("the one endpoint device") through an edge server;
   routing an incoming call involving the one endpoint device by establishing, for passing media in the incoming call, a primary network connection for the incoming call and a secondary network connection for the incoming call via respective first and second ones of the disparate last-segment channel types; and
   using connection control circuitry to
      assess, based on at least one QoS (quality of service) parameter involving at least one of the primary and secondary network connections and an anticipated or actual location transition of the one endpoint device, portions of the media from at least one of the primary network connection and the secondary network connection,
      combine, in response to the assessed portions of the media, media packets from the primary network connection and the secondary network connection, thereby using the primary network connection and the secondary network connection as redundant media channels to facilitate the incoming call between the one endpoint device and the edge server, and
      use a scoring metric or a likelihood of success that is associated with a currently-available channel for use by the one endpoint device as a redundant connection channel for the call and with indication of value concerning any of a plurality of different issues identifiable from the apparatus and/or a user profile stored for the one endpoint device.

17. A non-transitory tangible computer-program product containing instructions for use by a computer circuit, wherein execution of the instructions by the computer circuit causes operations to be carried out as follows:
   communicating data communications, in response to data-communications services provided by at least one communications-provider server ("server set"), between one of a plurality of endpoint devices ("the one endpoint device") and an edge server, wherein the data-communications services are provided by establishing channels from among disparate last-segment channel types of respective networks accessible to the one endpoint device and the edge server;
   establishing for passing media in the incoming call, in response to an incoming call routed by the server set and involving the one endpoint device, a primary network connection for the incoming call and a secondary network connection for the incoming call via respective first and second ones of the disparate last-segment channel types;
   assessing, based on at least one QoS (quality of service) parameter involving at least one of the primary and secondary network connections and an anticipated or actual location transition of the one endpoint device, portions of the media from at least one of the primary network connection and the secondary network connection;
   using a scoring metric or a likelihood of success that is associated with a currently-available channel for use by the one endpoint device as a redundant connection channel for the call and with indication of value concerning any of a plurality of different issues identifiable from the apparatus and/or a user profile stored for the one endpoint device; and
   combining, in response to the assessed portions of the media, media packets from the primary network connection and the secondary network connection, thereby using the primary network connection and the secondary network connection as redundant media channels to facilitate the incoming call between the one endpoint device and the edge server.

18. The non-transitory tangible computer-program product of claim 17, wherein the computer circuit is part of the one endpoint device and the instructions are downloadable by the one endpoint device.

19. The non-transitory tangible computer-program product of claim 17, wherein the computer circuit is part of the edge server and the instructions are downloadable by the edge server.

* * * * *